United States Patent
Li et al.

(10) Patent No.: US 12,501,335 B2
(45) Date of Patent: Dec. 16, 2025

(54) NETWORK RESELECTION FOR A NETWORK SHARING SPLIT ARCHITECTURE

(71) Applicant: ZTE Corporation, Guangdong (CN)

(72) Inventors: Dapeng Li, Guangdong (CN); Yin Gao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 331 days.

(21) Appl. No.: 17/670,003

(22) Filed: Feb. 11, 2022

(65) Prior Publication Data

US 2022/0167227 A1 May 26, 2022

Related U.S. Application Data

(63) Continuation of application No. PCT/CN2019/100503, filed on Aug. 14, 2019.

(51) Int. Cl.
*H04W 36/08* (2009.01)
*H04W 36/00* (2009.01)

(52) U.S. Cl.
CPC ..... *H04W 36/087* (2023.05); *H04W 36/0064* (2023.05)

(58) Field of Classification Search
CPC ......... H04W 36/0055; H04W 36/0072; H04W 36/08
See application file for complete search history.

(56) References Cited

U.S. PATENT DOCUMENTS

| 10,701,613 | B2 | 6/2020 | Gao et al. | |
| 11,895,549 | B2 * | 2/2024 | Awada | H04W 36/14 |
| 11,903,051 | B2 * | 2/2024 | Masini | H04B 7/18528 |
| 2018/0332516 | A1 | 11/2018 | Oak et al. | |
| 2018/0376380 | A1 | 12/2018 | Leroux | |
| 2019/0124506 | A1 * | 4/2019 | Tenny | H04W 36/0038 |
| 2019/0313244 | A1 * | 10/2019 | Wang | H04W 8/26 |
| 2019/0320352 | A1 * | 10/2019 | Lee | H04W 76/27 |

(Continued)

FOREIGN PATENT DOCUMENTS

| CN | 107770825 A | 3/2018 | |
| CN | 109151871 A * | 1/2019 | H04W 24/04 |

(Continued)

OTHER PUBLICATIONS

Chinese office action issued in CN Patent Application No. 201980099317.6, dated Jan. 25, 2024, 18 pages. English translation included.

(Continued)

*Primary Examiner* — Shah M Rahman
(74) *Attorney, Agent, or Firm* — Perkins Coie LLP

(57) ABSTRACT

Methods, systems, and devices related to digital wireless communication, and more specifically, to techniques related to related to reselecting a network in a network sharing split architecture. In one exemplary aspect, a method for wireless communication includes a central node associated with a previous network receiving a rerouting message from a distributed node indicating that a network for the terminal is reselected from the previous network to a new network. The method also includes the central node associated with a previous network transmitting an allocation message to a central node associated with the new network.

18 Claims, 12 Drawing Sheets

(56) References Cited

U.S. PATENT DOCUMENTS

| | | | | |
|---|---|---|---|---|
| 2020/0068453 | A1* | 2/2020 | Wang | H04W 24/10 |
| 2020/0154330 | A1* | 5/2020 | Paladugu | H04W 36/026 |
| 2020/0374947 | A1* | 11/2020 | Jin | H04W 88/085 |
| 2020/0413306 | A1* | 12/2020 | Decarreau | H04B 7/0617 |
| 2021/0092667 | A1* | 3/2021 | Zhu | H04W 40/24 |
| 2021/0176802 | A1* | 6/2021 | Sirotkin | H04W 36/0033 |
| 2021/0227435 | A1* | 7/2021 | Hsieh | H04W 36/087 |
| 2022/0030498 | A1* | 1/2022 | Futaki | H04W 36/0058 |
| 2022/0070740 | A1* | 3/2022 | Futaki | H04W 36/0061 |
| 2022/0182905 | A1* | 6/2022 | Xu | H04W 36/322 |

FOREIGN PATENT DOCUMENTS

| | | | | |
|---|---|---|---|---|
| CN | 109391963 | A | 2/2019 | |
| CN | 109819491 | A | 5/2019 | |
| EP | 3796745 | A1 * | 3/2021 | H04L 5/0048 |
| WO | 2017141749 | A1 | 8/2017 | |
| WO | 2019/024599 | A1 | 2/2019 | |
| WO | 2019029661 | A1 | 2/2019 | |
| WO | 2019056979 | A1 | 3/2019 | |
| WO | 2019059836 | A1 | 3/2019 | |
| WO | 2019061179 | A1 | 4/2019 | |
| WO | 2019137519 | A1 | 7/2019 | |

OTHER PUBLICATIONS

European Search Report for EP Patent Application No. 19941300.6, dated Jul. 22, 2022, 12 pages.

Ericsson, "Response paper to R3-185596 and R3-185739," 3GPP TSG-RAN WG3 Meeting #101bis, R3-186053, Chengdu, P.R. China, Oct. 8-12, 2018, 7 pages.

International Search Report and Written Opinion mailed on Mar. 27, 2020 for International Application No. PCT/CN2019/100503, filed on Aug. 14, 2019 (7 pages).

Chinese office action issued in CN Patent Application No. 201980099317.6, dated Aug. 28, 2024, 17 pages. English translation included.

Chinese office action issued in CN Patent Application No. 201980099317.6, dated Dec. 13, 2024, 20 pages. English translation included.

European Communication pursuant to Article 94(3) EPC issued in EP Patent Application No. 19941300.6, dated Dec. 18, 2024, 4 pages.

Chinese Notification to Complete Formalities of Registration issued in CN Patent Application No. 201980099317.6, dated Jun. 2, 2025, 14 pages. English translation included.

Huawei, "RRC connection reestablishment procedure for CU-DU," 3GPP TSG RAN WG3 meeting #98, R3-174477, Reno, Nevada, US, Nov. 27-Dec. 1, 2017, 10 pages.

Huawei, "RRC connection reestablishment procedure for CU-DU," 3GPP TSG RAN WG3 meeting #97bis, R3-173731, Prague, Czech, Aug. 9-13, 2017, 5 pages.

Huawei, "Support RRC inactive mode for CU-DU," 3GPP TSG RAN WG3 meeting #97, R3-173133, Berlin, Germany, Aug. 21-25, 2017, 2 pages.

* cited by examiner

NETWORK RESELECTION FOR A NETWORK SHARING SPLIT ARCHITECTURE

CROSS-REFERENCE TO RELATED APPLICATIONS

This application is a continuation of International Patent Application No. PCT/CN2019/100503, filed on Aug. 14, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reselecting a network in a network sharing split architecture.

In one exemplary aspect, a method for wireless communication includes a central node associated with a previous network receiving a rerouting message from a distributed node indicating that a network for the terminal is reselected from the previous network to a new network. The method also includes the central node associated with a previous network transmitting an allocation message to a central node associated with the new network.

In another exemplary aspect, a method for wireless communication includes a distributed node reselecting a network associated with a terminal from a previous network to a new network. The method also includes the distributed node transmitting a first message to a central node associated with the previous network, the first message including a request for context information relating to the terminal.

In another exemplary aspect, a method for wireless communication includes a central node associated with a new network receiving a rerouting message from a distributed node indicating that a network for the terminal is reselected from a previous network to the new network. The method also includes the central node associated with a new network transmitting a first message to a central node associated with the previous network including a request for context information relating to a terminal.

In another exemplary aspect, a method for wireless communication includes a distributed node reselecting a network associated with a terminal from a previous network to a new network. The method also includes the distributed node transmitting a reroute message to a central node associated with the new network requesting terminal context information associated with the terminal. The method also includes the distributed node receiving a reroute response message from the central node associated with the new network.

In another exemplary aspect, a wireless communications apparatus comprising a processor is disclosed. The processor is configured to implement a method described herein.

In yet another exemplary aspect, the various techniques described herein may be embodied as processor-executable code stored on a computer-readable program medium.

Some embodiments may preferably implement the following solutions, written in a clause-format.

1. A solution for wireless communication, comprising: receiving, by a central node associated with a previous network, a rerouting message from a distributed node indicating that a network for the terminal is reselected from the previous network to a new network; and transmitting, by the central node associated with the previous network, an allocation message to a central node associated with the new network.

2. The solution of clause 1, wherein the rerouting message is received via an F1 interface 3. The solution of clause 1, wherein the allocation message is transmitted via an Xn interface.

4. The solution of clause 1, wherein the rerouting message includes a F1 application protocol identifier (F1AP ID) assigned to the terminal by the central node associated with the previous network.

5. The solution of clause 1, wherein the rerouting message includes an F1AP ID assigned to the terminal by the distributed node.

6. The solution of clause 1, wherein the distributed node is configured to reselect the network for the terminal from the previous network to the new network based on receiving a radio resource control (RRC) resume complete message from the terminal.

7. The solution of clause 1, wherein the reallocation message includes at least one of terminal context information and a RRC complete message transmitted by the terminal.

8. The solution of clause 1, wherein the new network is a public land mobile network (PLMN) that is reselected for the terminal, and wherein the new network is indicated in a selected PLMN identity field in a RRC resume complete message transmitted by the terminal.

9. The solution of clause 1, further comprising: receiving, by the by the central node associated with the previous network, an allocation response message from the central node associated with the new network; and transmitting, by the central node associated with the previous network, a reroute response message to the distributed unit.

10. The solution of clause 9, wherein the allocation response message includes an XN application protocol identifier (XNAP ID) and a F1AP ID.

11. The solution of clause 9, wherein the reroute response message includes a F1AP ID assigned by the central node associated with the new network.

12. A solution for wireless communication, comprising: reselecting, by a distributed node, a network associated with a terminal from a previous network to a new network; and transmitting, by the distributed node, a first message to a central node associated with the previous network, the first message including a request for context information relating to the terminal.

13. The solution of clause 12, further comprising: receiving, by the distributed node, a second message from the central node associated with the previous network including the context information relating to the terminal.

14. The solution of clause 13, wherein the second message includes any of: globally unique core network node identifier associated with a terminal, trace information, international mobile station equipment identity information, a masked version of international mobile station equipment identity information, and location reporting information.

15. The solution of clause 12, further comprising: transmitting, by the distributed node, an initial uplink transfer message to a central node associated with the new network; and receiving, by the distributed node, a terminal context setup message from the central node associated with the new network.

16. The solution of clause 12, wherein the first message includes any of a F1AP ID associated to the terminal by the central node associated with the previous network and a F1AP ID associated to the terminal by the distributed node.

17. A solution for wireless communication, comprising: receiving, by a central node associated with a new network, a rerouting message from a distributed node indicating that a network for the terminal is reselected from a previous network to the new network; and transmitting, by the central node associated with the new network, a first message to a central node associated with the previous network including a request for context information relating to a terminal.

18. The solution of clause 17, further comprising: receiving, by the central node associated with the new network, a second message from the central node associated with the previous network including context information relating to the terminal.

19. The solution of clause 17, further comprising: transmitting, by the central node associated with the new network, an initial terminal message to a core network node to reselect the terminal to the new network; and receiving, by the central node associated with the new network, an initial terminal response message from the core network node.

20. The solution of clause 19, further comprising: forwarding, by the central node associated with the new network, the received initial terminal response message to the distributed node to complete reselection of the network of the terminal.

21. A solution for wireless communication, comprising: reselecting, by a distributed node, a network associated with a terminal from a previous network to a new network; transmitting, by the distributed node, a reroute message to a central node associated with the new network requesting terminal context information associated with the terminal; and receiving, by the distributed node, a reroute response message from the central node associated with the new network.

22. The solution of clause 21, wherein the reroute response message includes an XN application protocol identifier (XNAP ID) and a F1 application protocol identifier (F1AP ID) assigned for the terminal by the central node associated with the new network.

23. The solution of clause 18, further comprising: receiving, by the distributed node, a terminal context setup message including terminal context information from the central node associated with the new network.

24. An apparatus for wireless communication comprising a processor that is configured to carry out the solution of any of clauses 1 to 23.

25. A non-transitory computer readable medium having code stored thereon, the code when executed by a processor, causing the processor to implement a solution recited in any of clauses 1 to 23.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

Figure 1:
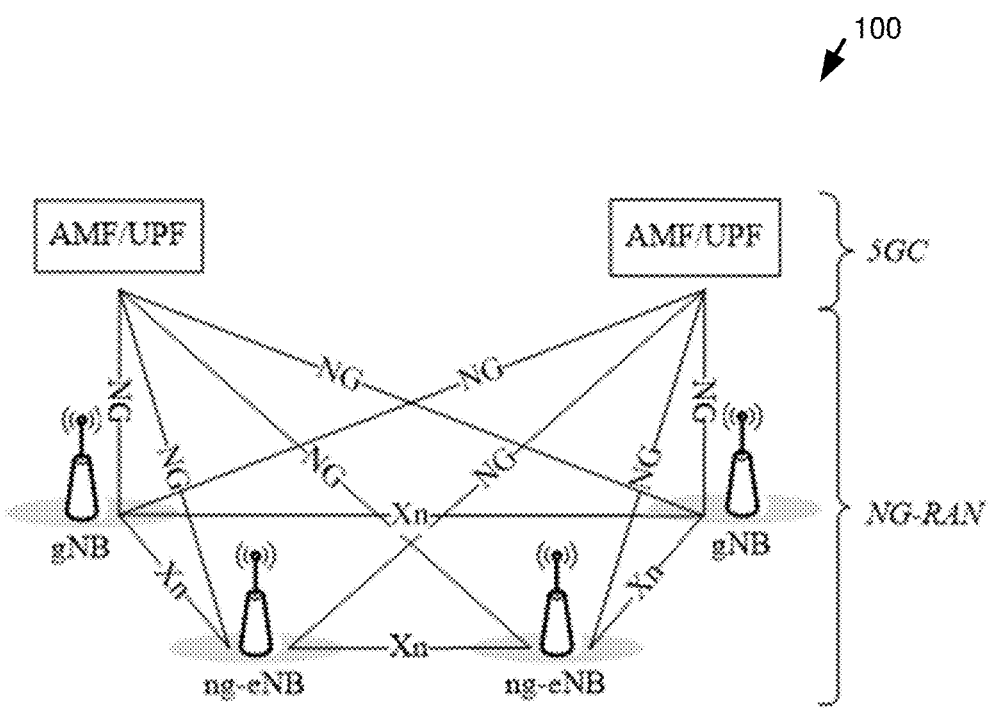
FIG. 1 is a schematic diagram of a 5G structure.

FIG. 1 is a schematic diagram of a 5G structure 100. In some embodiments, the schematic may represent a 5G structure as specified by the 3GPP TS 38.300 protocol. As shown in FIG. 1, the structure 100 may include a 5G core network (5GC or 5G core) and a 5G access network. The 5G core network may include network elements relating to an access and mobility management unit (AMF), a user plane function (UPF), and a 5G access network that may include a network element 5G enhanced eNB base station (ng-eNB) or a 5G base station (gNB). The interface between the network element of the core network and the network element of the access network may include an NG interface, and the interface between the network elements of the access network may include an Xn interface.

Figure 2:
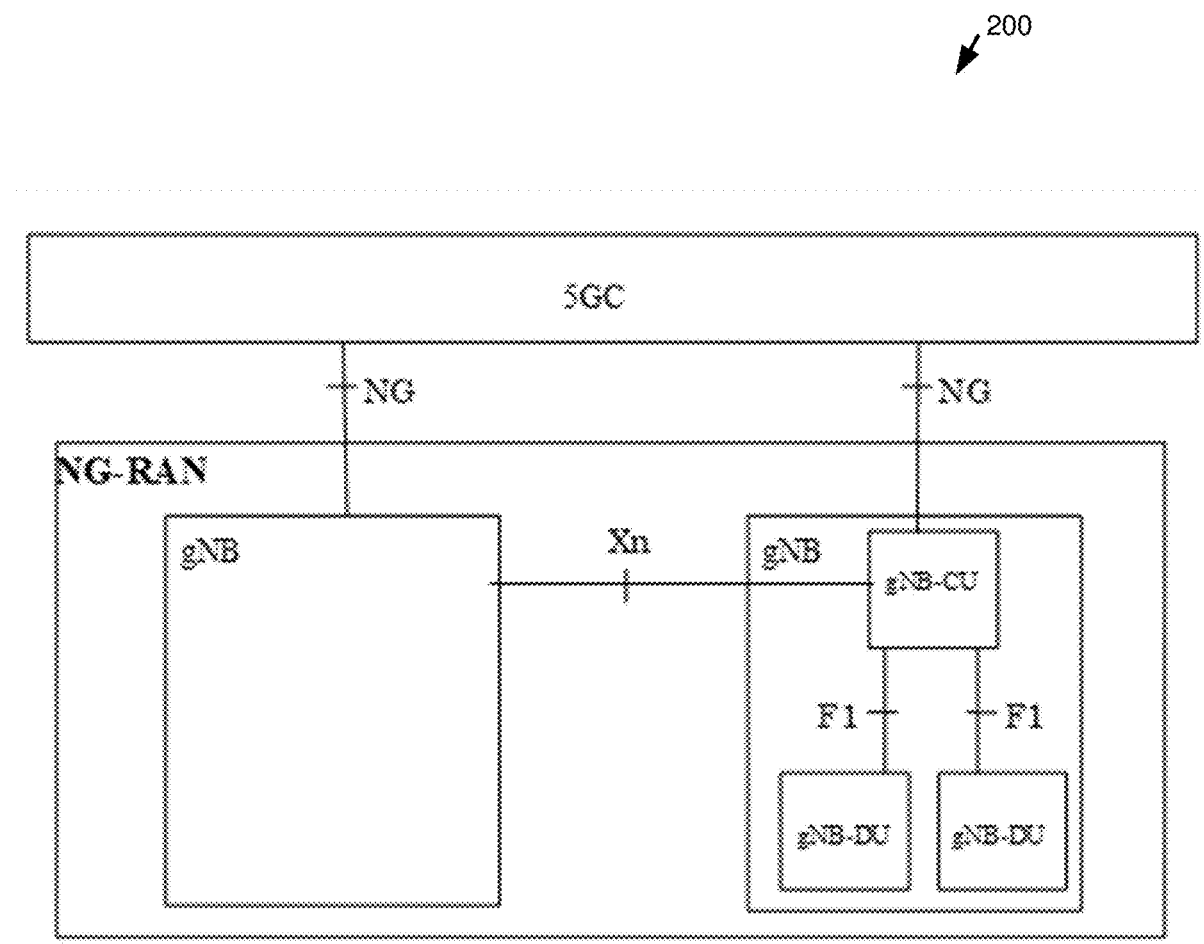
FIG. 2 is a diagram of a predetermined protocol CU-DU architecture.

FIG. 2 is a diagram 200 of a predetermined protocol CU-DU architecture. As shown in FIG. 2, the interface between the CUs of different access network elements may include a Xn interface, and the interface between the CU and the DU in the access network element may include an F1 interface.

Figure 3:
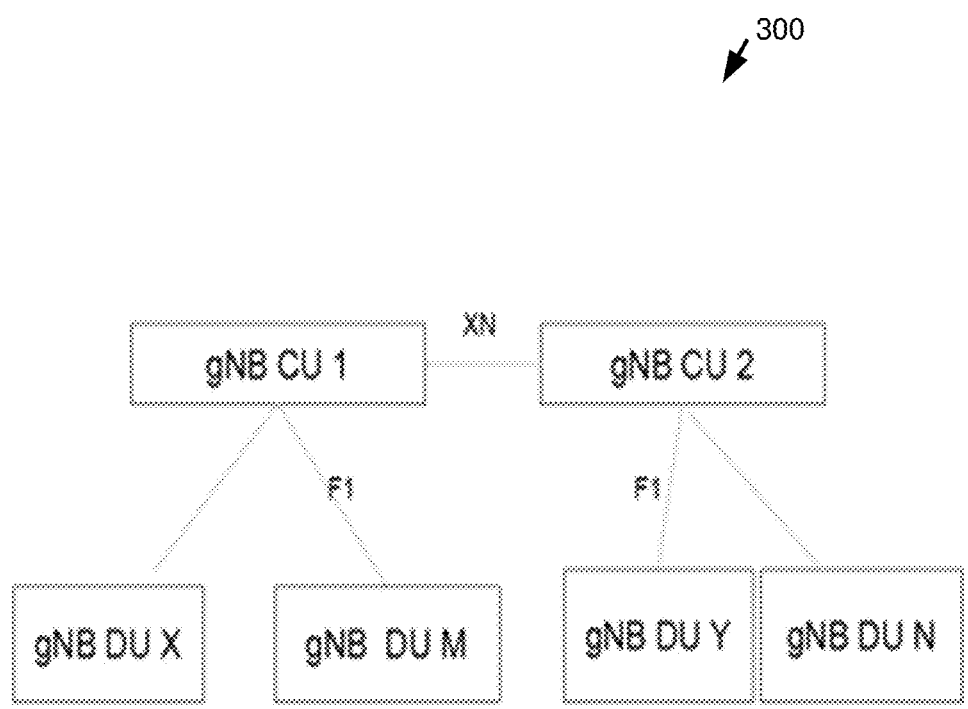
FIG. 3 is a schematic diagram of logical connections in an access network element.

FIG. 3 is a schematic diagram 300 of logical connections in an access network element. As shown in FIG. 3, the CU may be divided into a control plane CU (CU-C) and a user plane CU (CU-U). The interface between the DU and the CU-C may be an F1-C interface. The interface between a DU and CU-U may include a F1-U interface. Different access network elements of the CU-C interfaces may be between Xn-C interfaces. Different access network element of the CU-U interface may be Xn-U interfaces. The interface between the CU-C and the core network element may include an NG-C interface, and the interface between the CU-U and the core network element may include an NG-U interface.

A network sharing architecture allows multiple participating operators to share resources of a single network according to a negotiated distribution mechanism. The shared network may include a wireless access network. Network sharing may include the sharing of wireless resources. An allocation mechanism can include planning according to a service level agreement.

In a scenario where network sharing is not supported, a DU device may only be connected to one CU device. However, in a scenario that supports network sharing, a DU device can be connected to multiple different CU devices. For example, the DU device supports multiple carrier networks, and the DU device can be connected to multiple CU devices supporting different carrier networks. The carrier networks supported by these CU devices may not be the same.

Figure 4:
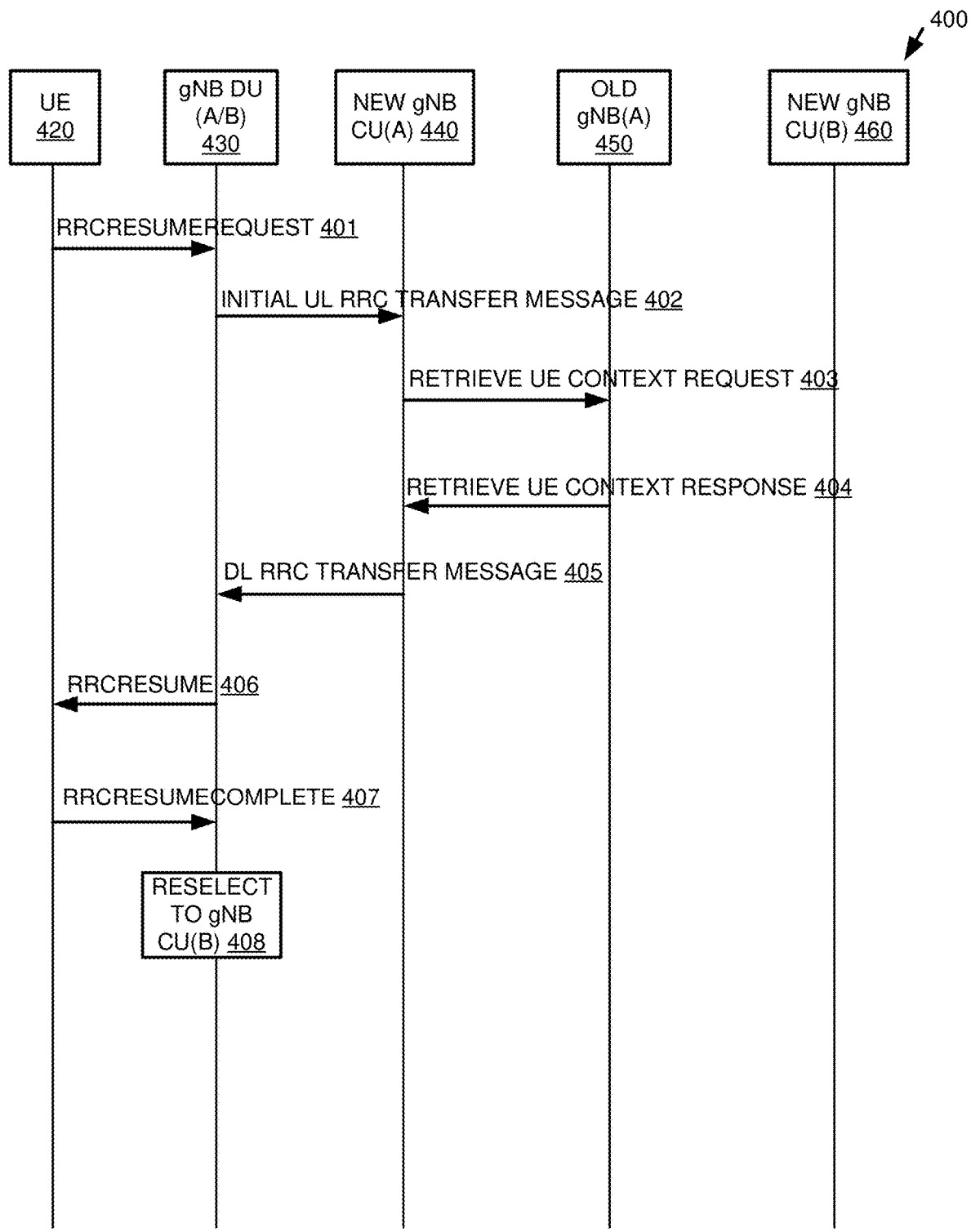
FIG. 4 is a signaling process to support network sharing functions under the CU-DU separation architecture.

FIG. 4 is a signaling process 400 to support network sharing functions under the CU-DU separation architecture. As shown in FIG. 4, the signaling process may support network sharing functions under the CU-DU separation architecture. In this scenario, gNB DU may support both network A (PLMN A) and network B (PLMN B). Therefore, it is marked as gNB-DU(A/B) in FIG. 4.

In step 401, the UE 420 may initiate a resume process. Initiating a resume process may include transmitting a RRCResume request message to gNB DU(A/B) 430 that supports network sharing. As noted above, gNB DU(A/B) 430 may support both Network A (PLMN A) and Network B (PLMN B).

In step 402, the gNB-DU(A/B) may send an initial UL RRC transfer message to select a first network (Network A). The gNB-DU associated with the UE 420 may select gNB-CU(A) 440 associated with network A.

In step 403, the new gNB-CU(A) 440 may send a retrieve UE context request message to an old gNB(A) 450.

In step 404, the old gNB(A) 450 may send a UE context response message to the new gNB-CU(A) 440. In steps 403 and 404, the new gNB CU(A) may obtain the UE context from an old gNB(A).

In step 405, the new gNB-CU(A) may generate and send a RRCResume message to the gNB-DU(A/B). The DL RRC transfer message may be sent to the gNB-DU(A/B) via an F1 interface.

In step 406, the gNB-DU(A/B) 430 may forward the RRCResume message to the UE 420.

In step 407, the UE 420 may send a RRCResumeComplete message to the gNB-DU(A/B).

In step 408, upon receipt of the RRCResumeComplete message, the gNB-DU(A/B) associated with the UE NAS may select network B (PLMN B). The gNB-DU and a plurality of gNB-CU's are connected via the F1 interface, the gNB-DU may select a new CU.

However, there still may not be a context associated with the UE on the gNB-CU(A) and what kind of flow message is used by the RRCResumeComplete message to be sent to the gNB-DU.

Therefore, the technical problem to be solved may include how to retrieve UE context from a CU belonging a to previous network to a new CU belonging to a new network to reselect the network.

System Overview

This patent document relates to reselecting a network in a network sharing scenario under a CU-DU separation architecture.

In a first exemplary embodiment, a first step may include a gNB-DU sending a rerouting message to a gNB-CU of the current network. The message can be a new message (e.g., a REROUTE RRC MESSAGE) sent via a F1 interface. The parameters carried by the message may include one or a combination of the following: The F1AP ID assigned by the UE to the source gNB CU; The F1AP ID assigned by the UE in the gNB DU; Reselect network CU device information; Reselect network information; The RRCResumeComplete message sent by the UE. The gNB-DU of the current network may refer to the gNB-CU selected by the gNB-DU for the UE before receiving the RRCResumeComplete.

In a second step, the gNB-CU may send a reassignment message to the reselection network gNB-CU. The reassignment message may include a new Xn interface message (e.g., CU NODE REALLOCATION). The reassignment message may include at least the following parameters: UE context information; The RRCResumeComplete message sent by the UE. The reselection network may refer to the PLMN information reselected by the UE and may be included in the carrier network in the selected PLMN-Identity field in the RRCResumecomplete message.

In a second exemplary embodiment, a first step may include a gNB-DU sending a rerouting message to the gNB-CU of the reselected network. The message can be a new F1 message, (e.g., REROUTE RRC MESSAGE). The parameters carried by the message may include one or a combination of the following: The base station where the UE context is located; The F1AP ID assigned by the UE at the base station where the context is located; The F1AP ID assigned by the UE in the gNB DU. Auxiliary information of the UE context may be obtained, such as the UE Context ID, the Integrity protection, the New Cell Identifier, the New Cell Identifier, and the information is reported to the gNB-DU through the UE.

The network reselection gNB-CU may refer to the RRCResumecomplete message selected PLMN-Identity field at the operator network and gNB-DU connected gNB-CU device.

In a second step, the gNB-CU may reselect the network base station to acquire the UE context from the base station where the UE context is located. Network reselection gNB-CU may obtain the UE context information through XN interface via a RETRIEVE UE CONTEXT message.

Example Embodiment 1

Figure 5:
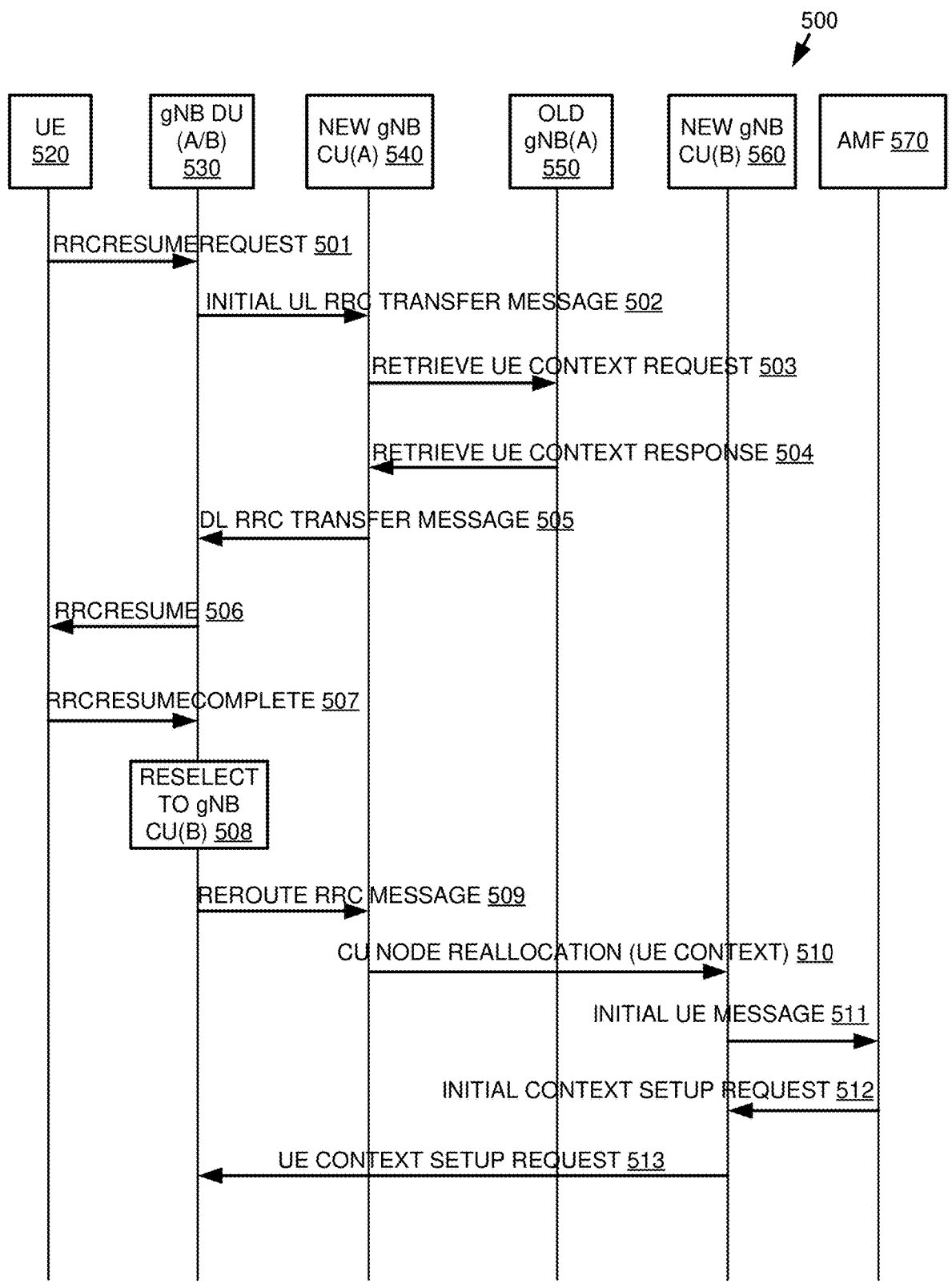
FIG. 5 is a signaling process for reselecting a network in a network sharing scenario with a CU-DU separation architecture, in accordance with a first example embodiment.

FIG. 5 is a signaling process for reselecting a network in a network sharing scenario with a CU-DU separation architecture, in accordance with a first example embodiment.

Steps 501-506 may be similar to steps 401-406 as described with respect to FIG. 4. The UE 520 may send an RRCResumeRequest UE 520 to the gNB DU that is supporting network sharing, where the DU may support both Network A (PLMN A) and Network B (PLMN B). The DU may not know that the UE 520 will reselect a network for the UE 520 chosen to support network A of GNB CU(A). The gNB-CU(A) 540 may obtain the context information of the UE 520 from the old gNB 550. The gNB-CU(A) 540 may generate an RRCResume message and send it to the UE 520.

In step 507, the UE 520 may send a RRCResumeComplete message to the gNB-DU(A/B) 530. In this message, the UE 520 may select network B. In the selected PLMN-Identity IE of the message, the non-access stratum of the UE 520 may select the network B (PLMN B).

In step 508, the gNB-DU(A/B) 530 may reselect a new network for the UE 520 by selecting gNB-CU(B) associated with network B. The gNB DU (A/B) 530 may be simultaneously connected to multiple gNB CUs that support different networks. When an F1 connection is established between the gNB CU and the gNB DU, the network information supported by the gNB CU can be obtained through the interaction information (e.g., the gNB-CU(A) supporting network A, the gNB CU (B) supporting network B. Based on the above information, the gNB DU may select a gNB CU (B) as the CU has access in the reselected network.

In step 509, the gNB-DU may send a routing message to the gNB-CU(A) 540. Since the gNB CU(A) may include the context of the saved UE 520, the gNB DU may send an F1 interface message requesting the gNB CU(A) to forward the context of the saved UE 520 to the gNB CU(B). The message can be a new F1 message, for example a REROUTE RRC MESSAGE.

The parameters carried by the message include one or a combination of the following: The F1AP ID assigned by the UE 520 in gNB CU(A); the F1AP ID assigned by the UE 520 in the gNB DU; reselect CU information, in this case gNB CU(B); Reselect the network information of the CU, in this case PLMN B; and the RRCResumeComplete message sent by the UE 520.

In step 510, the gNB-CU may send a CU node reallocation (UE context) message to the new gNB-CU(B) 650. If the CU supports the inter-CU redirection procedure, the gNB-CU(A) may send a message to the gNB-CU(B), the message can include a new incoming message over the Xn interface, such as a CU NODE REALLOCATION message.

The parameters carried by the message include one or a combination of the following: The F1AP ID assigned by the UE 520 in gNB CU(A); The F1AP ID assigned by the UE in the gNB DU; UE context content, which is obtained from the old gNB; UE GUAMI information, which is obtained from the old gNB; Trace information, which is obtained from the old gNB; IMEI information, Masked IMEISV, where this information is obtained from the old gNB the Location Reporting Information, the information from the old cogNB acquisition; and the RRCResumeComplete message sent by the UE 520.

Step 511 may include sending an initial UE message from the new gNB-CU(B) 560 to the AMF 570.

Step 512 may include sending an initial context setup request from the AMF to the new gNB-CU(B).

In step 513, the new gNB-CU(B) 560 may send a UE CONTEXT SETUP REQUEST message to the gNB-DU(A/B) 530. After the core network is registered, the gNB may send a UE CONTEXT SETUP REQUEST message to the DU to complete the registration process.

Example Embodiment 2

Figure 6:
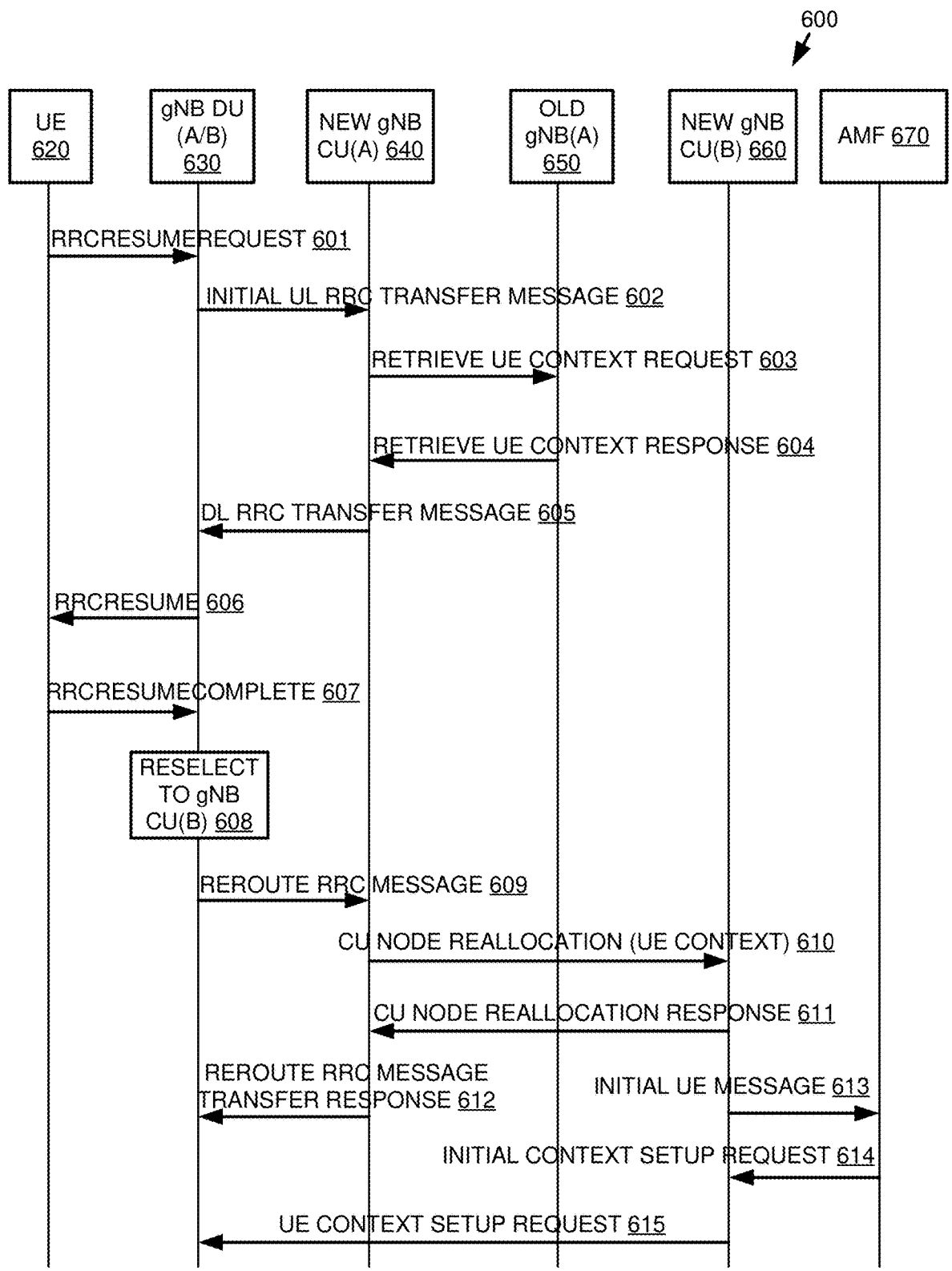
FIG. 6 is a signaling process for reselecting a network in a network sharing scenario with a CU-DU separation architecture, in accordance with a second example embodiment.

FIG. 6 is a signaling process for reselecting a network in a network sharing scenario with a CU-DU separation architecture, in accordance with a second example embodiment.

Steps 601-610 may be similar to steps 501-510 as described with respect to FIG. 5.

Considering that the relocation function may not be a mandatory system function, not all CUs may be supported. Therefore, after the gNB DU sends a REROUTE RRC MESSAGE, if the gNB CU(B) does not support the reselection network function, the process may not be executed.

In step 611, the gNB-CU(B) 660 may send a response message to the new gNB-CU(A) 640. If a gNB CU(B) supports reselection of network functions, it may respond successfully. A new XN interface message can be used, such as a CU NODE REALLOCATION RESPONSE message. The message may include a XNAP ID and F1AP ID assigned by the gNB CU(B) to the UE 620.

If gNB CU(B) 660 does not support reselection of network functions, or if processing fails, a failure response may be returned. A new XN interface message can be used, such as a CU NODE REALLOCATION FAILURE message.

In step 612, the new gNB-CU(A) 640 may send a transfer response message to the gNB-DU(A/B) 630. After receiving the feedback message from gNB CU(B), the gNB CU (A) may send a message to the DU. The message may include information fed back from the gNB CU (B), such as the F1AP ID information assigned by the gNB CU (B).

Example Embodiment 3

Figure 7:
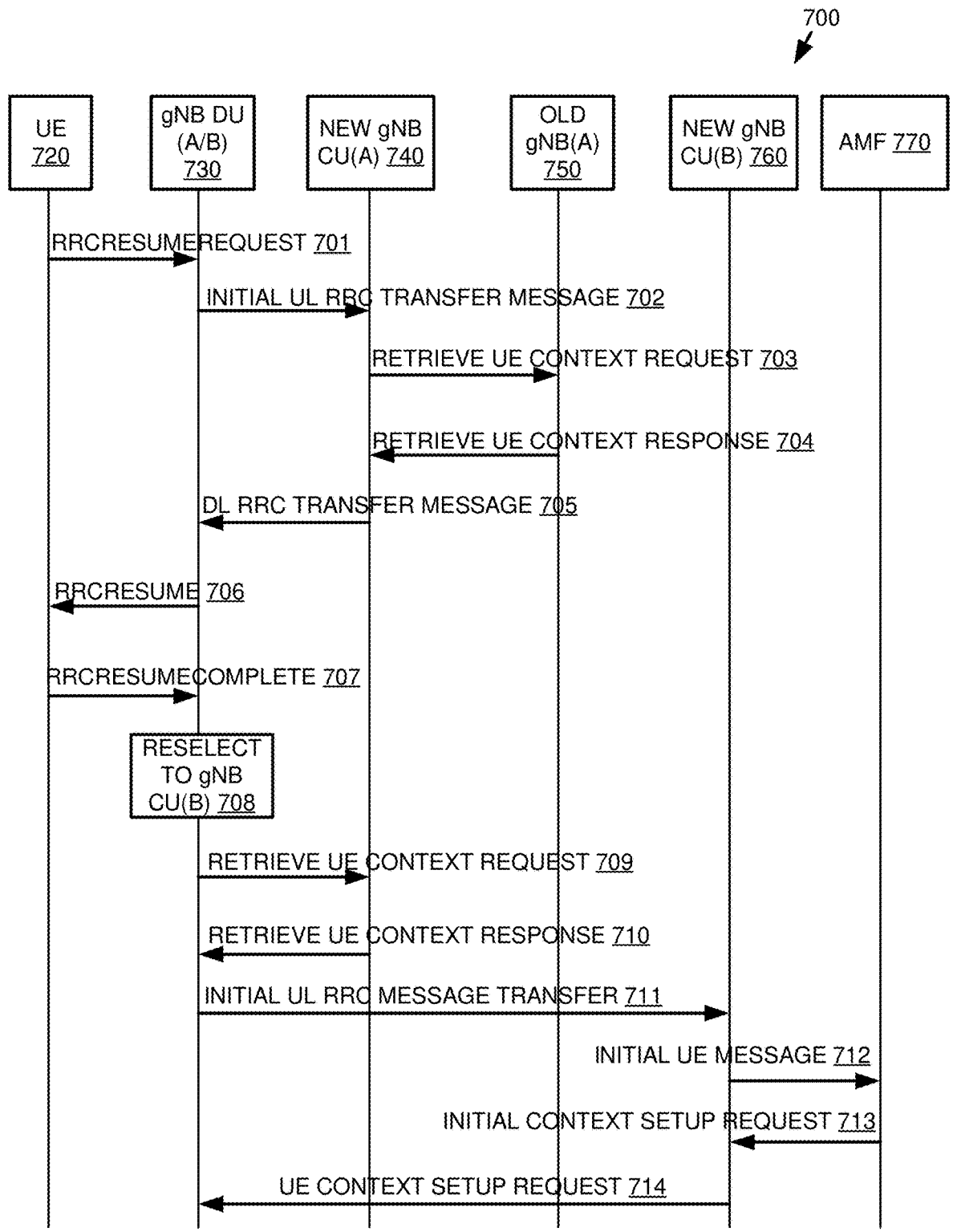
FIG. 7 is a signaling process for reselecting a network in a network sharing scenario with a CU-DU separation architecture, in accordance with a third example embodiment.

FIG. 7 is a signaling process for reselecting a network in a network sharing scenario with a CU-DU separation architecture, in accordance with a third example embodiment. Steps 701-708 may be similar to steps 501-508 as described with respect to FIG. 5.

In step 709, the gNB-DU(A/B) 730 may request to receive the UE context on the gNB-CU(A) by sending a retrieve UE context request to a new gNB-CU(A) 740. The gNB-DU may determine to switch the UE 720 to the network B and to a gNB CU(B) base station.

At this time, the UE context on gNB-CU(A) may need to be transmitted to the gNB CU(B) base station. The gNB-DU may actively acquire the UE context from the CU. A new F1 interface message can be used, such as a RETRIEVE UE CONTEXT REQUEST message. Included in the message may include any of a F1AP ID assigned by the UE 720 in gNB CU(A) and a F1AP ID assigned by the UE 720 in the gNB DU.

In step 710, the new gNB-CU(A) 740 may send UE context to a gNB-DU(A/B) 730 via a retrieve UE context response message. This message may include UE context content, which is obtained from the old gNB; UE's GUAMI information, which may be obtained from the old gNB; trace information obtained from the old gNB; IMEI information, Masked IMEISV information obtained from the old gNB; and location reporting information obtained from the old gNB.

In step 711, the gNB-DU(A/B) 730 may reselect the network to the gNB-CU(B) base station and send an initial UL RRC transfer message to the new gNB-CU(B) 760. The gNB-DU may reuse the existing message INITIAL UL RRC MESSAGE TRANSFER, but the content included may be an RRC ResumeComplete IE and may also include a UE context.

Steps 712-714 may include the gNB-DU completing reselection of the network.

In step 712, the new gNB-CU(B) 760 may send an initial UE message to the AMF 770.

In step 713, the AMF 770 may send an initial context setup request to the new gNB-CU(B). The core network may return a response message to the network to complete the reselection of the gNB-CU(B).

In step 714, the new gNB-CU(B) may send a UE context setup request to the gNB-DU(A/B) 730.

Example Embodiment 4

Figure 8:
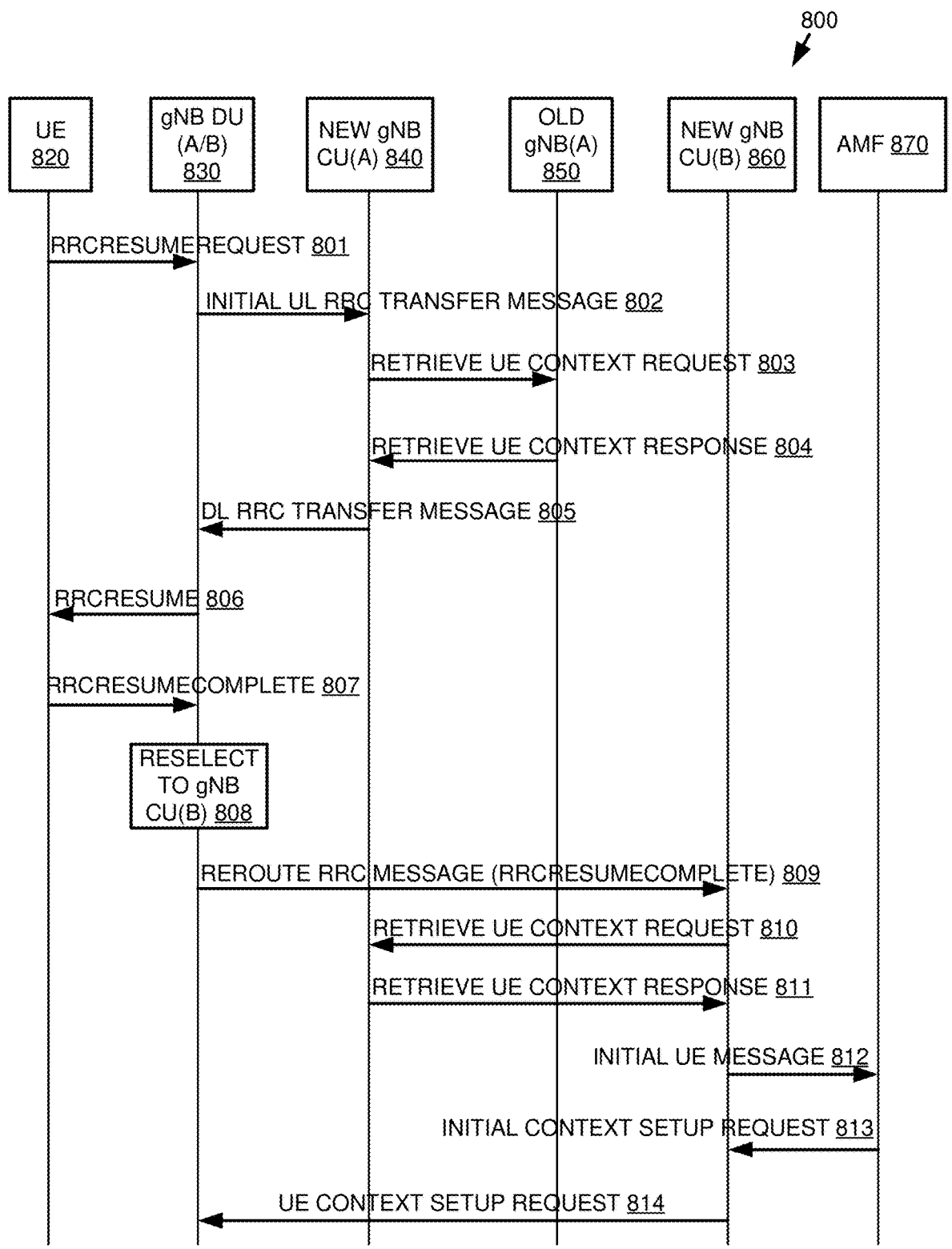
FIG. 8 is a signaling process for reselecting a network in a network sharing scenario with a CU-DU separation architecture, in accordance with a fourth example embodiment.

FIG. 8 is a signaling process for reselecting a network in a network sharing scenario with a CU-DU separation architecture, in accordance with a fourth example embodiment. The fourth example embodiment may include reselecting the network device to actively acquire the UE context.

Steps 801-808 may be similar to steps 501-508 as described with respect to FIG. 5.

In step 809, the gNB-DU(A/B) 830 may send a reselection message directly to the reselection network via a reroute RRC message (RRCResumeComplete) to the new gNB-CU (B) 860. After determining that the UE 820 needs to select a new network, the gNB-DU may select a new network access device for the UE 820, that is, the gNB CU(B) base station, for example. The gNB-DU may need to inform the gNB CU(B) base station UE context to be saved on the gNB-CU(A). A new F1 interface messages can be used, such as the REROUTE RRC MESSAGE.

The parameters carried by the message include one or a combination of the following: the base station where the UE context is located, in this case gNB CU(A), the F1AP ID assigned by the UE 820 in gNB CU(A), and the F1AP ID assigned by the UE 820 in the gNB DU. Auxiliary information of the UE context may be obtained, such as the Integrity protection, the New Cell Identifier, the New Cell Identifier, and the information is reported to the gNB-DU through the UE 820.

Steps 810-811 may include reselecting the network base station to acquire the UE context from the base station where the UE context is located. In this example, the gNB CU(B) base station may obtain the UE context from the gNB CU(A) base station. Using the information obtained in step 809, the gNB CU(B) base station may obtain the UE context using the RETRIEVE UE CONTEXT procedure.

Steps 812-814 may include the gNB-DU completing reselection of the network. The core network may return a response message and complete the reselection of the network to gNB-CU(B).

Example Embodiment 5

Figure 9:
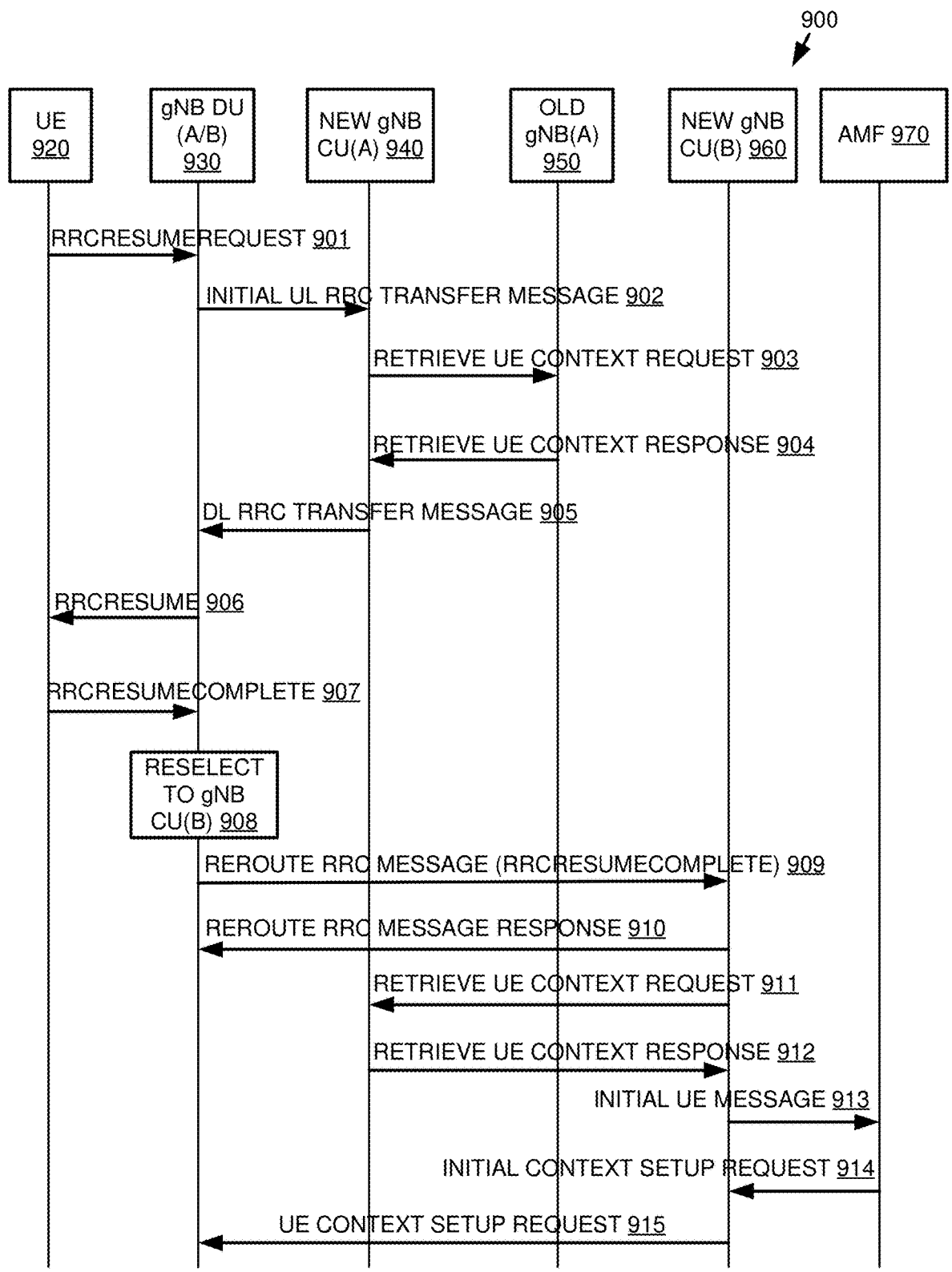
FIG. 9 is a signaling process for reselecting a network in a network sharing scenario with a CU-DU separation architecture, in accordance with a fifth example embodiment.

FIG. 9 is a signaling process for reselecting a network in a network sharing scenario with a CU-DU separation architecture, in accordance with a fifth example embodiment.

In Example Embodiment 5, the gNB-DU 930 may send a reselection message directly to the reselection network and obtain a response message.

In some embodiments, the relocation function may not be a mandatory system function, not all CUs may be supported. Therefore, after the gNB DU may issue a REROUTE RRC MESSAGE, if the gNB CU(B) does not support the reselection of the network function, the process may be unable to be performed.

In step 910, the gNB-CU(B) may receive a reroute RRC message response from a gNB-DU(A/B). If a gNB CU(B) supports reselection of network functions, it may respond successfully. A new Xn interface messages can be used, such as a REROUTE RRC MESSAGE RESPONSE message. The message may include the XNAP ID and F1AP ID assigned by the gNB CU(B) to the UE 920.

Figure 10:
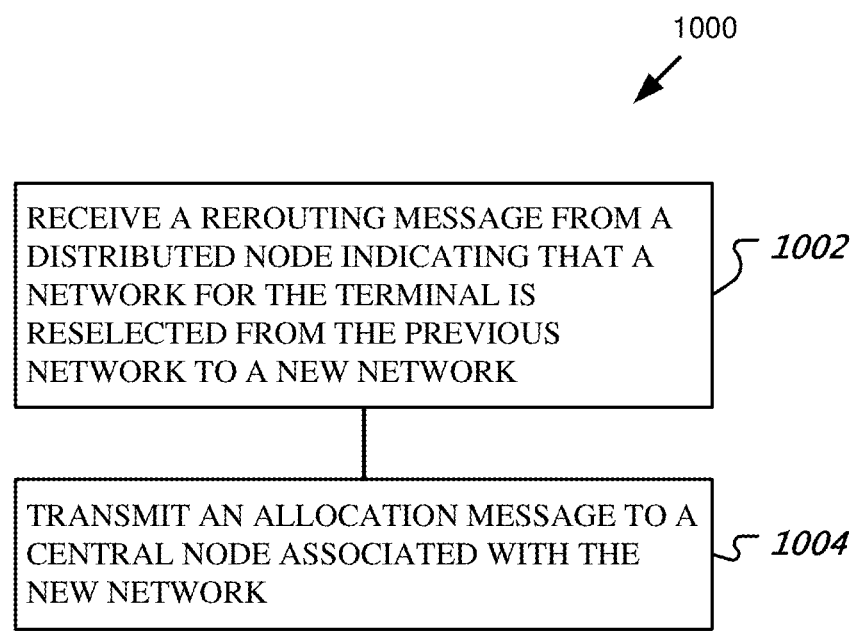
FIG. 10 illustrates a block diagram of an example method for reselecting a network in a split network architecture.

FIG. 10 illustrates a block diagram 1000 of a method to reselect a network in a network sharing split architecture. The method may include receiving a rerouting message from a distributed node indicating that a network for the terminal is reselected from the previous network to a new network (block 1002). A central node associated with a previous network (e.g., New gNB CU(A) 540 as described in FIG. 5) may receive the rerouting message from a distributed node (e.g., gNB DU (A/B) 530 as described in FIG. 5). The routing message may include a reroute RRC message 509 as described with respect to FIG. 5.

The method may also include transmitting an allocation message to a central node associated with the new network (block 1004). A central node associated with a previous network (e.g., New gNB CU(A) 540 as described in FIG. 5) may transmit the allocation message to a central node associated with the new network (e.g., gNB CU (B) 560 as described in FIG. 5). The allocation message may include a CU node reallocation message 510 as described in FIG. 5.

In some embodiments, the rerouting message is received via an F1 interface.

In some embodiments, the allocation message is transmitted via an Xn interface.

In some embodiments, the rerouting message includes a F1 application protocol identifier (F1AP ID) assigned to the terminal by the central node associated with the previous network.

In some embodiments, the rerouting message includes an F1AP ID assigned to the terminal by the distributed node.

In some embodiments, the distributed node is configured to reselect the network for the terminal from the previous network to the new network based on receiving a radio resource control (RRC) resume complete message from the terminal.

In some embodiments, the reallocation message includes at least one of terminal context information and a RRC complete message transmitted by the terminal.

In some embodiments, the new network is a public land mobile network (PLMN) that is reselected for the terminal, and wherein the new network is indicated in a selected PLMN identity field in a RRC resume complete message transmitted by the terminal.

In some embodiments, the method includes receiving, by the by the central node associated with the previous network, an allocation response message from the central node associated with the new network; and transmitting, by the central node associated with the previous network, a reroute response message to the distributed unit.

In some embodiments, the allocation response message includes an XN application protocol identifier (XNAP ID) and a F1AP ID.

In some embodiments, the reroute response message includes a F1AP ID assigned by the central node associated with the new network.

In another embodiment, a method for wireless communication may include reselecting, by a distributed node, a network associated with a terminal from a previous network to a new network. The distributed node (e.g., gNB DU (A/B) 630 as described in FIG. 6) may reselect a network in step 608 as described with respect to FIG. 6.

The method may also include transmitting, by the distributed node, a first message to a central node associated with the previous network, the first message including a request for context information relating to the terminal. The first message may include a reroute RRC message 609 as described with respect to FIG. 6. The central node associated with the previous network may include the new gNB CU(A) 640 as described in FIG. 6.

In some embodiments, the method includes receiving, by the distributed node, a second message from the central node associated with the previous network including the context information relating to the terminal.

In some embodiments, the second message includes any of: globally unique core network node identifier associated with a terminal, trace information, international mobile station equipment identity information, a masked version of international mobile station equipment identity information, and location reporting information.

In some embodiments, the method includes transmitting, by the distributed node, an initial uplink transfer message to a central node associated with the new network; and receiving, by the distributed node, a terminal context setup message from the central node associated with the new network.

In some embodiments, the first message includes any of a F1AP ID associated to the terminal by the central node associated with the previous network and a F1AP ID associated to the terminal by the distributed node.

In another embodiment, a method for wireless communication may include receiving, by a central node associated with a new network, a rerouting message from a distributed node indicating that a network for the terminal is reselected from a previous network to the new network. The rerouting message may include reroute RRC message (RRCRESUMECOMPLETE) 809 as described in FIG. 8.

The method may also include transmitting, by the central node associated with the new network, a first message to a central node associated with the previous network including a request for context information relating to a terminal. The first message may include the retrieve UE context request 810 as described in FIG. 8.

In some embodiments, the method includes receiving, by the central node associated with the new network, a second message from the central node associated with the previous network including context information relating to the terminal.

In some embodiments, the method includes transmitting, by the central node associated with the new network, an initial terminal message to a core network node to reselect the terminal to the new network; and receiving, by the central node associated with the new network, an initial terminal response message from the core network node.

In some embodiments, the method includes forwarding, by the central node associated with the new network, the received initial terminal response message to the distributed node to complete reselection of the network of the terminal.

In another embodiment, a method for wireless communication may include reselecting, by a distributed node, a network associated with a terminal from a previous network to a new network. The distributed node (e.g., gNB DU(A/B) 930 as described in FIG. 9) may reselect to gNB CU(B) in step 908 as described in FIG. 9.

The method may also include transmitting, by the distributed node, a reroute message to a central node associated with the new network requesting terminal context information associated with the terminal. The reroute message may include reroute RRC message (RRCRESUMEMESSAGE) 909 as described in FIG. 9.

The method may also include receiving, by the distributed node, a reroute response message from the central node associated with the new network. The reroute response message may include the reroute RRC message response 910 as described in FIG. 9.

In some embodiments, the reroute response message includes an XN application protocol identifier (XNAP ID) and a F1 application protocol identifier (F1AP ID) assigned for the terminal by the central node associated with the new network.

In some embodiments, the method includes receiving, by the distributed node, a terminal context setup message including terminal context information from the central node associated with the new network.

Figure 11:
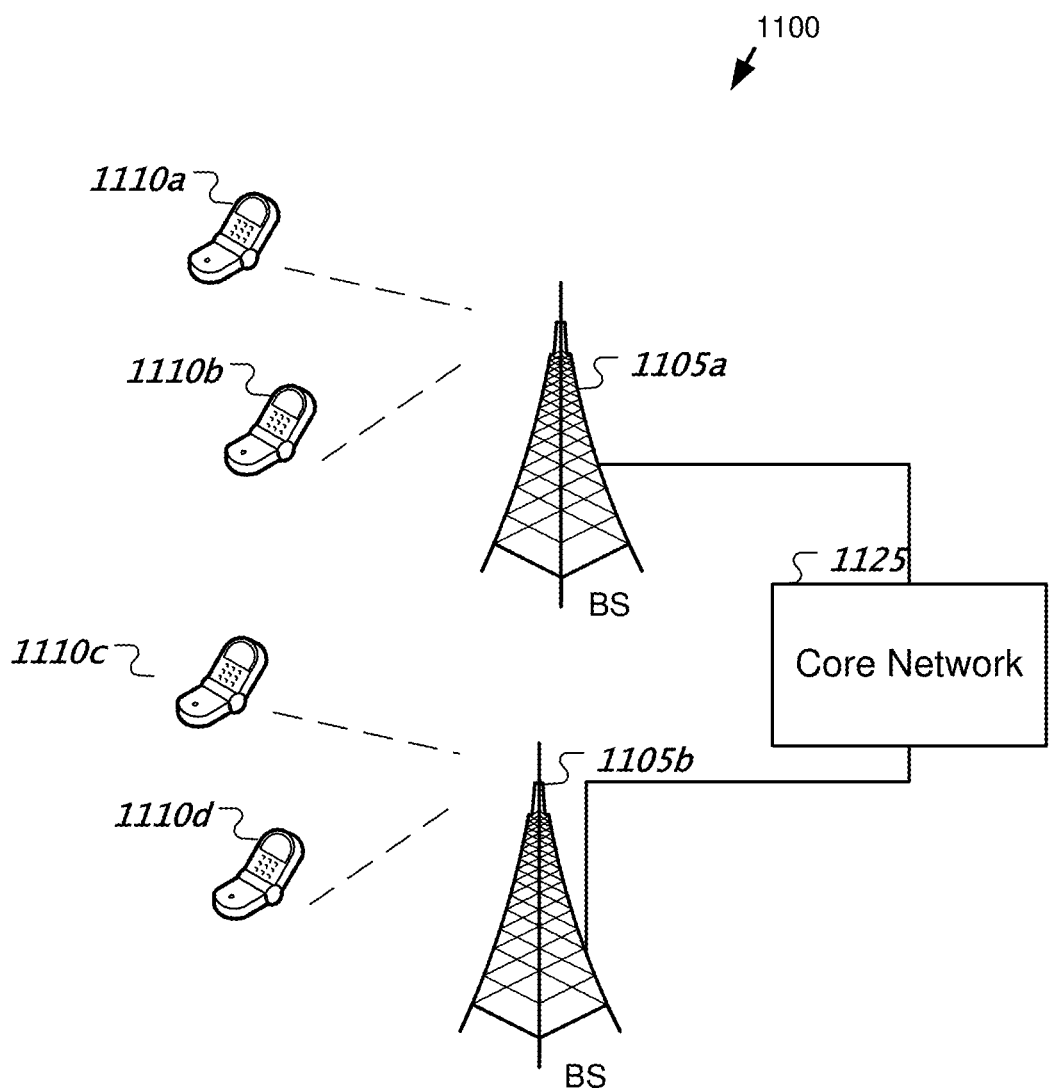
FIG. 11 shows an example of a wireless communication system where techniques in accordance with one or more embodiments of the present technology can be applied.

FIG. 11 shows an example of a wireless communication system where techniques in accordance with one or more embodiments of the present technology can be applied. A wireless communication system 1100 can include one or more base stations (BSs) 1105a, 1105b, one or more wireless devices 1110a, 1110b, 1110c, 1110d, and a core network 1125. A base station 1105a, 1105b can provide wireless service to wireless devices 1110a, 1110b, 1110c and 1110d in one or more wireless sectors. In some implementations, a base station 1105a, 1105b includes directional antennas to produce two or more directional beams to provide wireless coverage in different sectors.

The core network 1125 can communicate with one or more base stations 1105a, 1105b. The core network 1125 provides connectivity with other wireless communication systems and wired communication systems. The core network may include one or more service subscription databases to store information related to the subscribed wireless devices 1110a, 1110b, 1110c, and 1110d. A first base station 1105a can provide wireless service based on a first radio access technology, whereas a second base station 1105b can provide wireless service based on a second radio access technology. The base stations 1105a and 1105b may be co-located or may be separately installed in the field according to the deployment scenario. The wireless devices 1110a, 1110b, 1110c, and 1110d can support multiple different radio access technologies. In some embodiments, the base stations 1105a, 1105b may be configured to implement some techniques described in the present document. The wireless devices 1110a to 1110d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 12:
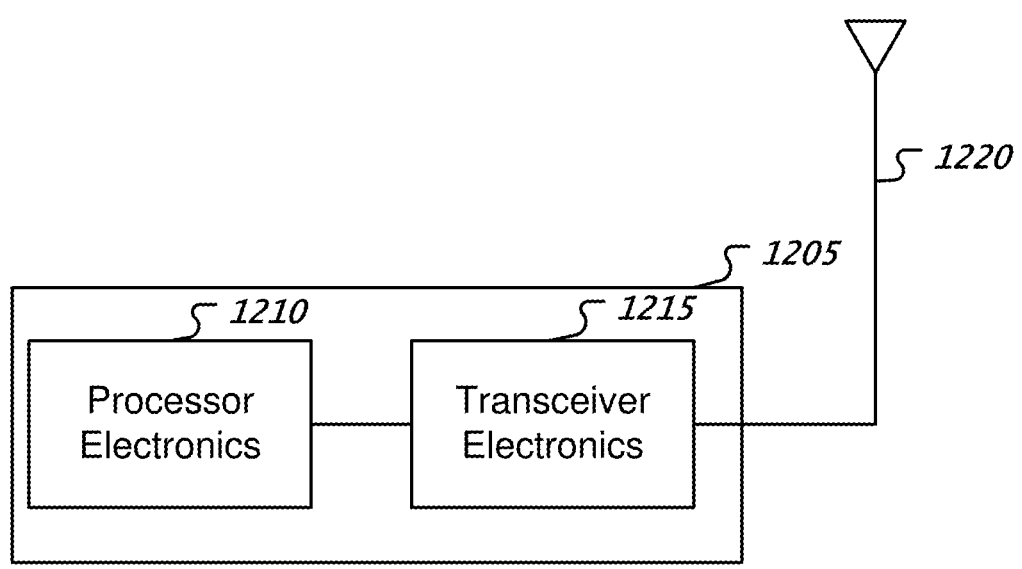
FIG. 12 is a block diagram representation of a portion of a hardware platform.

FIG. 12 is a block diagram representation of a portion of a hardware platform. A hardware platform 1205 such as a network device or a base station or a wireless device (or UE) can include processor electronics 1210 such as a microprocessor that implements one or more of the techniques presented in this document. The hardware platform 1205 can include transceiver electronics 1215 to send and/or receive wired or wireless signals over one or more communication interfaces such as antenna 1220 or a wireline interface. The hardware platform 1205 can implement other communication interfaces with defined protocols for transmitting and receiving data. The hardware platform 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions, a central node, a distributed node, a terminal or network nodes are implemented using the hardware platform 1205.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a central node associated with a previous network, a rerouting message from a distributed node indicating that a network for a terminal is reselected from the previous network to a new network; and
   transmitting, by the central node associated with the previous network, an allocation message directly to a central node associated with the new network,
   wherein the allocation message includes terminal context information and a radio resource control (RRC) complete message received from the terminal.

2. The method of claim 1, wherein the rerouting message includes: an F1 application protocol identifier (F1AP ID) assigned to the terminal by the central node associated with the previous network; or an F1AP ID assigned to the terminal by the distributed node.

3. The method of claim 1, wherein the distributed node is configured to reselect the network for the terminal from the previous network to the new network based on receiving a radio resource control (RRC) resume complete message from the terminal.

4. The method of claim 1, wherein the new network is a public land mobile network (PLMN) that is reselected for the terminal, and wherein the new network is indicated in a selected PLMN identity field in a RRC resume complete message transmitted by the terminal.

5. The method of claim 1, further comprising:
receiving, by the central node associated with the previous network, an allocation response message from the central node associated with the new network; and
transmitting, by the central node associated with the previous network, a reroute response message to the distributed node.

6. The method of claim 5, wherein the allocation response message includes an XN application protocol identifier (XNAP ID) and an F1AP ID.

7. The method of claim 5, wherein the reroute response message includes an F1AP ID assigned by the central node associated with the new network.

8. The method of claim 1, wherein the rerouting message is received via an F1 interface.

9. The method of claim 1, wherein the allocation message is transmitted via an Xn interface.

10. An apparatus for wireless communication, comprising:
a memory; and
processor electronics configured to cause the apparatus to:
receive a rerouting message from a distributed node indicating that a network for a terminal is reselected from a previous network to a new network; and
transmit an allocation message directly to a central node associated with the new network,
wherein the apparatus is a central node associated with a previous network, and
wherein the allocation message includes terminal context information and a radio resource control (RRC) complete message received from the terminal.

11. The apparatus of claim 10, wherein the rerouting message includes: an F1 application protocol identifier (F1AP ID) assigned to the terminal by the central node associated with the previous network; or an F1AP ID assigned to the terminal by the distributed node.

12. The apparatus of claim 10, wherein the distributed node is configured to reselect the network for the terminal from the previous network to the new network based on receiving a radio resource control (RRC) resume complete message from the terminal.

13. The apparatus of claim 10, wherein the new network is a public land mobile network (PLMN) that is reselected for the terminal, and wherein the new network is indicated in a selected PLMN identity field in a RRC resume complete message transmitted by the terminal.

14. The apparatus of claim 10, further comprising:
receiving an allocation response message from the central node associated with the new network; and
transmitting a reroute response message to the distributed node.

15. The apparatus of claim 14, wherein the allocation response message includes an XN application protocol identifier (XNAP ID) and an F1AP ID.

16. The apparatus of claim 14, wherein the reroute response message includes an F1AP ID assigned by the central node associated with the new network.

17. The apparatus of claim 10, further comprising:
an F1 interface,
wherein the rerouting message is received via the F1 interface.

18. The apparatus of claim 10, further comprising:
an Xn interface,
wherein the allocation message is transmitted via the Xn interface.

* * * * *